United States Patent [19]

Burba, III

[11] Patent Number: 4,461,714

[45] Date of Patent: Jul. 24, 1984

[54] METHOD OF MAKING CRYSTALLINE 2-LAYER LITHIUM ALUMINATES IN ION EXCHANGE RESINS

[75] Inventor: John L. Burba, III, Angleton, Tex.

[73] Assignee: The Dow Chemical Company, Midland, Mich.

[21] Appl. No.: 412,678

[22] Filed: Aug. 30, 1982

Related U.S. Application Data

[63] Continuation-in-part of Ser. No. 217,614, Dec. 18, 1980, Pat. No. 4,348,295.

[51] Int. Cl.$^3$ ................................................. C09K 3/00
[52] U.S. Cl. ..................................... 252/184; 423/122; 423/127; 423/131; 423/179.5; 521/28; 502/11; 502/12; 502/402; 502/414; 502/415; 502/514; 502/527
[58] Field of Search ............ 423/122, 127, 131, 179.5; 521/28; 252/184; 502/10, 11, 12, 402, 414, 415, 514, 527

[56] References Cited

U.S. PATENT DOCUMENTS

| | | | |
|---|---|---|---|
| 4,116,856 | 9/1978 | Lee et al. ............................ | 252/184 |
| 4,116,857 | 9/1978 | Lee et al. ............................ | 252/184 |
| 4,348,295 | 9/1982 | Burba ................................. | 252/184 |
| 4,348,296 | 9/1982 | Bauman et al. ..................... | 252/184 |

*Primary Examiner*—Benjamin R. Padgett
*Assistant Examiner*—Matthew A. Thexton
*Attorney, Agent, or Firm*—W. J. Lee

[57] ABSTRACT

The bayerite form of crystalline alumina, $Al(OH)_3$, contained within a macroporous ion exchange resin is converted to the gibbsite form of $Al(OH)_3$ by reaction with hot $MgX_2$, where X is halide, followed by water-washing the $MgX_2$ portion from the product, thereby causing the conversion of bayerite to the gibbsite form of crystalline $Al(OH)_3$. The gibbsite form may then be reacted with hot LiX solution, where X is anion, to form crystalline 2-layer $LiX \cdot 2Al(OH)_3 \cdot nH_2O$.

20 Claims, No Drawings

METHOD OF MAKING CRYSTALLINE 2-LAYER LITHIUM ALUMINATES IN ION EXCHANGE RESINS

CROSS-REFERENCE TO RELATED APPLICATIONS

This is a continuation-in-part application of copending application Ser. No. 217,614, filed Dec. 18, 1980, now U.S. Pat. No. 4,348,295, which teaches preparations of 2-layer and 3-layer lithium aluminates, with and without substrates such as ion exchange resins. Another copending application, Ser. No. 217,611 filed Dec. 18, 1980 now U.S. Pat. No. 4,348,296 also discloses preparation of 2-layer and 3-layer lithium aluminates on various substrates.

BACKGROUND OF THE INVENTION

U.S. Pat. No. 4,116,858 and U.S. Pat. No. 4,159,311, disclose that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX.2Al(OH)_3$ which is useful in selectively recovering $Li^+$ values from aqueous solutions, e.g., Li-containing brines.

U.S. Pat. No. 4,116,856 and U.S. Pat. No. 4,221,767 disclose that improvements in the above discussed formation of crystalline $LiX.2Al(OH)_3$ are found by reacting amorphous $Al(OH)_3$, or crystalline hydrous alumina (e.g., norstrandite, bayerite, gibbsite or mixtures of these) with LiOH to form $LiOH.2Al(OH)_3nH_2O$ which is then reacted with LiX to form the crystalline $LiX.2Al(OH)_3$, where X is halide.

U.S. Pat. No. 4,116,857 discloses formation of $MgCl_2.2Al(OH)3$ and the like in ion exchange resins.

Various forms of alumina, $Al_2O_3$, are known, some of which occur as natural minerals, some of which are hydrated, and some of which are crystalline. The Handbook of Chemistry shows the following:

| Name | Crystalline Form | M.P.° C |
|---|---|---|
| aluminum oxide, $Al_4O_3$ | hex. col. | 2050 |
| $\alpha$-$Al_2O_3$, corundum | trig; col. cr, n | 2015 |
| $\gamma Al_2O_3$, $\tau$-alumina | wh.micro.cr., n | tr.to alpha |
| $Al_2O_3.3H_2O$, gibbsite, (hydrargillite) | monocl., wh.cr. | tr.to $Al_2O_3.H_2O$ (Boehmite) |
| $Al_2O_3.3H_2O$, bayerite | wh.micro.cr. | tr.to $Al_2O_3.H_2O$ (Boehmite) |
| aluminum oxide, $Al_2O_3.xH_2O$ | amor.wh.pwd. | $-xH_2O$, tr. to $\gamma$-$Al_2O_3$ |

Norstrandite is a crystalline hydrous alumina, as are gibbsite and bayerite.

The present disclosure is believed to be most closely related to the above-identified patents and the patents are incorporated by reference in their entirety here. The teachings in U.S. Pat. No. 4,116,856 are particularly relevant where it discloses that crystalline hydrous alumina (e.g., norstrandite and/or bayerite) dispersed in ion exchange resin is not converted back to its original $LiX.2Al(OH)_3.nH_2O$ form by treatment with LiX unless the hydrous alumina is first, or simultaneously, reacted with LiOH. I have found, however, that crystalline hydrous aluminas can be reacted directly with lithium salts to form crystalline lithium salt aluminates if the correct ranges of temperature and concentration are employed. I have also found that 2-layer lithium aluminate can be regenerated, without conversion to gibbsite, by employing an aqueous wash containing at least about 800 ppm. $Li^+$. A macroporous ion exchange resin containing gibbsite provides a precursor for preparing crystalline 2-layer $LiX.2Al(OH)_3.nH_2O$ within the resin.

SUMMARY OF THE INVENTION

The gibbsite form of crystalline $Al(OH)_3$ is incorporated into a macroporous ion exchange resin by precipitating crystalline $Al(OH)_3$, bayerite, in situ in the resin and then reacting it at elevated temperature with a Mg halide solution.

DESCRIPTION OF THE INVENTION

Crystalline hydrous aluminas are reacted with lithium salts under the influence of elevated temperature and sufficient concentration to form lithium aluminates, designated here as $LiX.2Al(OH)_3.nH_2O$ where X is an anion characterized as an anion which will form acids when in molecular combination with hydrogen or will form salts when in molecular combination with metal ions. It will be understood, of course, that the lithium aluminates will normally contain some waters of hydration, designated as $nH_2O$ in the above formula. The anion may have a valence of 1, 2, or 3.

When the beginning hydrous alumina is amorphous, such as when freshly prepared by ammonia precipitation of $Al(OH)_3$ from an $AlCl_3$ solution, the reaction to form lithium aluminates may be done using relatively weak solutions of the lithium salt (up to about 10%) and at relatively low temperatures (e.g., 20° C.–40° C.), then when heated at, e.g., about 50° C. or higher, the lithium aluminate becomes crystallized as a 3-layer crystal.

However, when the beginning hydrous alumina is crystalline (such as bayerite, gibbsite, norstrandite, or boehmite), then the relatively low temperature treatment with lithium salt does not appear to form an appreciable amount (if any) of lithium aluminate within a reasonable length of time.

It has now been found, surprisingly, that when heated at elevated temperature of preferably about 85° C.–120° C., the mixture of crystalline hydrous alumina and lithium salt forms lithium aluminate. Along with this higher temperature, it is necessary that the lithium salt solution be of a relatively high concentration, preferably above about 12%, most preferably above about 20% or may be at the saturation limit of the lithium salt, especially if it is only slightly soluble. The combination of high temperature and high concentration is particularly effective in forcing the lithium salt into the layers of the hydrous alumina crystals, which in some cases gives a crystallographic unit cell having two layers of lithium salt and two layers of hydrous alumina and in other cases gives a crystallographic unit cell having three layers of lithium salt and three layers of hydrous alumina.

As used herein, the expressions "2-layer" and "3- layer" refer to the number of layers bounded on both sides by the aluminate layers into which the subject Li compounds are intercalated. It will be realized, of course, that the crystals of lithium aluminates are normally present as aggregates or stacks of a plurality of unit cells rather than each unit cell standing as a separate physical entity.

The lithium aluminates discussed here have two crystal structures, viz those of 2-layer crystallographic unit cells and those of 3-layer crystallographic unit cells. The 3-layer lithium aluminates have a 3-fold screw axis oriented parallel to the c-axis of the lithium aluminate crystal. The 2-layer lithium aluminates have a 2-fold axis of rotation oriented parallel to the c-axis, as determined by the x-ray crystal studies.

For purposes of discussion and description in this disclosure, 2-layer lithium aluminates and 3-layer lithium aluminates are graphically illustrated as follows:

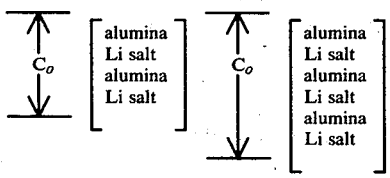

The heating of the mixture of lithium salt and hydrous alumina crystals may be performed in an open vessel, in a closed vessel, or at reflux. If performed in an open vessel where water vapor can escape, or if reduced pressure is applied to remove water vapor, the resulting increase in concentration of the lithium salt is beneficial in that the higher concentration tends to help drive the lithium salt into the alumina layers.

In those instances wherein water vapor is allowed to escape, a low concentration (generally less than about 10%) lithium salt may be employed at the outset, then the increase in concentration which results from water loss can be sufficient to drive the lithium salt into the hydrous alumina.

The preferred lower ratio of lithium salt to hydrous alumina, $Al(OH)_3$, in the mixture is about 0.5 moles of Li to 1 mole of Al. The upper limit of Li to Al is the saturation point of the lithium salt solution.

The lithium salts for reaction with the hydrous alumina can be at least one of the group exemplified by LiCl, LiBr, LiI, $LiNO_3$, $LiClO_4$, LiClO, LiSCN, LiOOCH, $LiC_2H_3O_2$, and the like. Stated another way the X in LiX may be any anion of a halo acid (excluding F), a mineral acid or inorganic acid, or an organic acid which is stable under reaction conditions. Virtually any water soluble lithium salt would be expected to be within the purview of this invention so long as the anion is not so large as to preclude entering the interstices of the alumina crystal.

The 2-layer variety of lithium aluminate is a novel composition and is prepared by reaction of lithium salt with gibbsite. Reaction of lithium salt with other forms of hydrous alumina, such as bayerite or norstrandite, produces 3-layer lithium aluminates. It is not possible to convert 2-layer lithium aluminate to 3-layer lithium aluminate without completely solubilizing the lithium aluminate to re-precipitate it as 3-layer.

The 2-layer $LiCl.2Al(OH)_3.nH_2O$ crystal, whether in neat form or supported on or within a substrate, exhibits different behavior in $H_2O$ than does the 3-layer variety. When reacted with $H_2O$ the 2-layer $LiCl.2Al(OH)_3.nH_2O$ decomposes to LiCl and gibbsite with the equilibrium LiCl concentration of about 0.14 moles of $Li^+$ per liter of solution, whereas the 3-layer $LiCl.2Al(OH)_3.nH_2O$ crystal is stable in $H_2O$ if there is as much as about 50 ppm $Li^+$ in the solution.

The 2-layer $LiX.2Al(OH)_3.nH_2O$ can be reacted with LiOH to form 2-layer $LiOH.2Al(OH)_3.nH_2O$; this can then be neutralized with an acid to form 2-layer lithium aluminate containing anions of the acid. Likewise 3-layer $LiOH.2Al(OH)_3.nH_2O$ can be neutralized with an acid to form 3-layer lithium aluminate containing anions of the acid.

The porous substrate into which the crystalline hydrous alumina can be loaded may be an inert material, such as an inorganic or organic material. For certain uses and reasons, the substrate is preferably a macroporous resin such as an ion exchange resin as taught in U.S. Pat. No. 4,116,858 and U.S. Pat. No. 4,116,856.

With respect to the incorporation of hydrous alumina into a macroporous ion exchange resin, it is found to be difficult to incorporate substantial amounts of crystalline $Al(OH)_3$ of the gibbsite variety into the resin as compared with the incorporation of amorphous $Al(OH)_3$ or of crystalline $Al(OH)_3$ of the bayerite or norstrandite variety which are relatively easy to incorporate. Since it is the gibbsite variety which yields the crystalline 2-layer $LiX.2Al(OH)_3.nH_2O$ of interest in this disclosure, then a method of incorporating increased amounts of gibbsite is desirable. This means is provided by incorporating bayerite into the resin, then reacting it with hot $MgX_2$ solution (where X is halide) to convert the bayerite to gibbsite. The $MgX_2$ portion is washed out with water, leaving the crystalline gibbsite form of $Al(OH)_3$. This gibbsite form is then reacted with LiX (where X is anion) to form crystalline 2-layer $LiX.2Al(OH)_3.nH_2O$. Even 3-layer $LiX.2Al(OH)_3.nH_2O$, when washed with water to remove the LiX portion leaving the aluminate crystal collapsed to bayerite, can be reacted with hot $MgX_2$ to form gibbsite.

The present disclosure encompasses the regeneration of 2-layer crystalline $LiX.2Al(OH)_3.nH_2O$, where X is halide, preferably chloride, when said 2-layer crystals are contained within an ion exchange resin, thereby forming a composite useful for removing $Li^+$ ions from solution. It has been found that an aqueous leaching used in regenerating the crystal will destroy the 2-layer crystal structure unless the leaching solution contains at least about 800 ppm $Li^+$ ion, preferably at least about 1000 ppm; the temperature of the leaching solution is preferably in the range of about 70° C. to about 100° C. If the $Li^+$ ions are the result of dissolving LiCl in water, then a $Li^+$ ion concentration of about 800 ppm is equivalent to about 4888 ppm of LiCl; a $Li^+$ ion concentration of about 1000 ppm is equivalent to about 6110 ppm of LiCl.

If a leaching solution is used which contains substantially less than about 800 ppm $Li^+$ ion concentration, then the 2-layer crystal structure may be substantially destroyed and when the hydrous alumina is rejuvenated by use of LiCl and/or LiOH along with heating, the crystal reforms as a 3-layer crystal.

The examples which follow are to illustrate particular embodiments; the invention is not limited to the particular embodiments illustrated, but is limited only by the claims.

EXAMPLE 1

A 50-gram portion of gibbsite is reacted with 200 ml of 20% LiCl solution at 115° C. for about 2 hours. The product obtained is 2-layer LiCl.2Al(OH)$_3$.nH$_2$O as determined by x-ray diffraction data.

EXAMPLE 2

A 200-ml portion of a macroporous ion exchange resin in bead form (DOWEX MWA-1, a Trademark of The Dow Chemical Company) containing gibbsite within its pores is reacted with about 500 ml of 20% LiCl solution at about 105° C. under reflux for about 2-3 hours. The reaction product obtained is 2-layer LiCl.2Al(OH)$_3$.nH$_2$O as determined by x-ray diffraction data.

EXAMPLE 3

A 200-ml portion of the same resin as in Example 2 above, but containing bayerite within its pores, is reacted with about 500 ml of 20% LiCl solution at about 105° C. under reflux for about 2-3 hours. The reaction product obtained is 3-layer LiCl.2Al(OH)$_3$.nH$_2$O as determined by x-ray diffraction data.

EXAMPLE 4

About 200 ml of the same resin as above, but containing norstrandite within its pores, is refluxed with about 500 ml of 20% LiCl solution for about 2-3 hours. The reaction product obtained is 3-layer LiCl.2Al(OH)$_3$.nH$_2$O as determined by x-ray diffraction data.

EXAMPLE 5

About 10 grams of 2-layer LiCl.2Al(OH)$_3$.nH$_2$O is repeatedly washed with 1% LiOH solution at room temperature until no Cl$^-$ is detected in the filtrate by AgNO$_3$ test. Analysis data from x-ray diffraction shows the material is 2-layer LiOH.2Al(OH)$_3$.nH$_2$O.

The 2-layer LiOH.2Al(OH)$_3$.nH$_2$O is titrated with CH$_2$CHCO$_2$H, acrylic acid, to a pH of 5. X-ray diffraction data shows 2-layer Li(CH$_2$CHCO$_2$).2Al(OH)$_3$.nH$_2$O.

EXAMPLE 6

A composite of 2-layer lithium aluminate/resin is prepared by reacting DOWEX MWA-1 ion exchange resin, containing gibbsite in its pores, with an aqueous 20% solution of LiCl at about 105° C. for one hour. The composite is prepared for use as a Li$^+$ value absorber by substantially "unloading" (i.e., regenerating) Li$^+$ values from the crystal by washing it with a 1000 ppm Li$^+$ solution at 90° C. The so-regenerated composite is useful for extracting Li$^+$ values from a Li$^+$-containing natural brine (Smackover brine) until the 2-layer crystal is again loaded with Li$^+$ values Regeneration with 1000 ppm Li$^+$ solution at 90° C. creates no gibbsite, indicating the 2-layer crystal remains intact. In contrast thereto, regenerating with water containing no Li$^+$ values, or containing only about 300 ppm Li$^+$ values causes degeneration of the 2-layer crystal to gibbsite, which contaminates the Li-containing effluant from the wash column.

Compounds made in accordance with the present disclosure are useful in selectively removing Li$^+$ values from aqueous solution and are also useful in exchanging of the anion (X) with other anions in aqueous solution. Of special interest is the removal of Li$^+$ values from natural brines, e.g., Smackover brine, and from ore leachings, e.g., Spodumene ore.

EXAMPLE 7

About 200 ml. of DOWEX MWA-1-OH ion exchange resin containing dispersed therein about 3.3 mmoles of bayerite per ml. of resin is heated with 400 ml. of 36% MgCl$_2$ solution. The solution is allowed to boil down and the temperature reaches about 150° C. After waterwashing the MgCl$_2$ portion from the product, it is found, by x-ray, that the aluminate crystal has collapsed to crystalline Al(OH)$_3$ of the gibbsite variety.

The so-formed gibbsite/resin composite is treated with LiCl solution (about 85° C.) to convert the gibbsite to crystalline 2-layer LiCl.2Al(OH)$_3$.nH$_2$O, as confirmed by x-ray analysis.

I claim:

1. A process for converting crystalline hydrous alumina, Al(OH)$_3$, bayerite, dispersed within a macroporous ion exchange resin to the gibbsite form, said process comprising
   reacting the bayerite/resin composite with a MgX$_2$ solution, where X is halide, at elevated temperature, and
   water-washing the MgX$_2$ portion from the so-formed product, thereby causing the formation of the gibbsite form of Al(OH)$_3$ in the resin.

2. The process of claim 1 wherein the elevated temperature for reaction with MgX$_2$ is a temperature in the range of about 100° C. to about 150° C.

3. The process of claim 1 wherein the concentration of the MgX$_2$ solution, at the start, is in the range of about 24% to about 40%.

4. The process of claim 1 wherein the MgX$_2$ is MgCl$_2$.

5. The process of claim 1 wherein the resin comprises macroporous beads of a crosslinked copolymer of styrene and divinylbenzene having pendant amine or quaternary ammonium groups.

6. A process for preparing crystalline 2-layer LiX.2Al(OH)$_3$.nH$_2$O, where X is anion and nH$_2$O represents waters of hydration, said process comprising
   reacting bayerite, dispersed within a macroporous ion exchange resin, with a MgX$_2$ solution, where X is halide, at elevated temperature, then water-washing the MgX$_2$ portion from the so-formed product, thereby causing the formation of gibbsite from the bayerite in the resin,
   then reacting the so-sormed gibbsite with hot LiX solution, where X is anion, thereby converting the gibbsite to crystalline 2-layer LiX.Al(OH)$_3$.nH$_2$O.

7. The process of claim 6 wherein the elevated temperature for reaction with MgX$_2$ is a temperature in the range of about 100° C. to about 150° C.

8. The process of claim 6 wherein the concentration of the MgX$_2$ solution, at the start, is in the range of about 24% to about 40%.

9. The process of claim 6 wherein the MgX$_2$ is MgCl$_2$.

10. The process of claim 6 wherein the resin comprises macroporous beads of a crosslinked copolymer of styrene and divinylbenzene having pendant amine or quaternary groups.

11. The process of claim 6 wherein the X anion of the Lix solution is an anion of a halo acid, excluding F, a mineral acid or inorganic acid, or an organic acid.

12. The process of claim 6 wherein the LiX solution is at least one of the lithium salts of the group comprising LiCl, LiBr, LiI, LiNO$_3$, LiClO$_4$, LiClO, LiSCN, LiOOCH, and LiC$_2$H$_3$O$_2$.

13. The process of claim 6 wherein the X anion of the LiX solution is the anion of a halo acid, excluding F.

14. The process of claim 6 wherein the X anion of the LiX solution is the anion of a mineral acid.

15. The process of claim 6 wherein the X anion of the LiX solution is the anion of an inorganic acid.

16. The process of claim 6 wherein the X anion of the LiX solution is the anion of an organic acid.

17. The process of claim 6 wherein the LiX is LiCl.

18. The process of claim 6 wherein the LiX is LiOOCH.

19. The process of claim 6 wherein the LiX is LiC$_2$H$_3$O$_2$.

20. The process of claim 6 wherein the hot LiX solution is at a temperature in the range of about 85° C. to about 120° C.

* * * * *